United States Patent

[11] 3,575,547

[72] Inventors David E. Cordier
 Hamden, Conn.;
 Victor V. D'Anciccio, Kalamazoo, Mich.;
 Richard A. Kolakowski, North Branford, Conn.
[21] Appl. No. 680,331
[22] Filed Nov. 3, 1967
 Division of Ser. No. 336,889, Jan. 10, 1964, Pat. No. 3,375,224
[45] Patented Apr. 20, 1971
[73] Assignee The Upjohn Company
 Kalamazoo, Mich.

[54] INSULATION IMPREGNATED WITH A POLYURETHANE RENDERED FLAMEPROOF WITH A HALOGENATED BISPHENOL AND A CONDUCTOR INSULATED WITH SUCH INSULATION
 2 Claims, No Drawings
[52] U.S. Cl. .................................................. 174/121,
 106/15, 117/124, 117/128.4, 117/132, 117/138.8,
 156/51, 156/231, 156/232, 156/278, 161/88,
 161/93, 161/171, 161/176, 161/190, 161/194,
 161/214, 161/219, 161/227
[51] Int. Cl. ....................................................... H01b 3/30,
 H01b 3/42
[50] Field of Search........................................... 156/51,
 331, 332, 335, 278; 161/(Isocyante), 214, 216,
 215, 219, 403, 218, 190, 231, 227, 194, 84, 171,
 176; 106/15; 260/45.7, 47, 45.95, 613, 75;
 252/8.1; 117/128.4, 232, 124, 132, 138.8;
 174/120, 121, 122, 124, 121 (R), (SR)

[56] References Cited
UNITED STATES PATENTS

| | | | |
|---|---|---|---|
| 2,916,403 | 12/1959 | Calderwood.................. | 117/128.4 |
| 3,027,287 | 3/1962 | Hammer et al. ............... | 174/121 |
| 3,084,182 | 4/1963 | McElroy......................... | 117/128.4 |
| 3,174,950 | 3/1965 | Cordier.......................... | 117/128.4 |
| 3,213,065 | 10/1965 | Bunge et al. .................. | 117/128.4 |
| 2,902,518 | 9/1959 | Hurdis et al. .................. | 260/613 |
| 3,183,109 | 5/1965 | Neumann et al............... | 106/252 |
| 3,218,215 | 11/1965 | Achterhof et al............... | 156/321 |
| 3,252,848 | 5/1966 | Borsellino ...................... | 156/332 |
| 3,268,467 | 8/1966 | Rye et al........................ | 156/331 |
| 3,309,261 | 3/1967 | Schiller et al.................. | 161/219X |

OTHER REFERENCES
 Dombrow, B. A., Polyurethanes, Reinhold, N.Y. (1957), copy in group 160. pages 16— 25 relied on

*Primary Examiner*—John T. Goolkasian
*Assistant Examiner*—W. E. Hoag
*Attorneys*—Eugene O. Retter and Denis A. Firth ABSTRACT: Fabric and fabric-sheathed insulated conductors having a tough, flexible polyurethane coating are obtained by impregnating the fabric or fabric-sheathed insulated conductor with a mixture in an inert solvent of (a) a polymethylene polyisocyanate capped with phenol or alkyl ($C_1$—$_9$) phenol and (b) an hydroxy terminated poly(ethylene/propylene) adipate of EW. 300 to 1200. The impregnated material is cured by heating at 300° F. to 500° F.

3,575,547

INSULATION IMPREGNATED WITH A POLYURETHANE RENDERED FLAMEPROOF WITH A HALOGENATED BISPHENOL AND A CONDUCTOR INSULATED WITH SUCH INSULATION

CROSS-REFERENCES TO RELATED APPLICATIONS

This application is a division of application Ser. No. 336,889, filed Jan. 10, 1964 now U.S. Pat. No. 3,375,224.

The present invention deals with an impregnating and bonding resin. In particular, it is concerned with a stable, one-component urethane composition based on polymethylene polyphenylisocyanate and a specific type of linear, long chain, hydroxyl-terminated polyester.

The impregnating and bonding resins of the present invention are especially suited for use with asbestos and glass-served wire, and as impregnating resins for glass, nylon or other fabric insulation. The compositions represent a considerable improvement in heat resistance over the thermoplastic and other resinous compositions formerly available for such purposes. In some instances these compositions can replace the more expensive silicone or fluorocarbon varnishes which have previously been used where heat resistance was required. Further, the urethane compositions of the present invention can be applied to the production of an essentially solvent-free, storage-stable, thermosetting electrical insulating tape, in which form they can be utilized for purposes and under conditions not practical for urethane compositions of the prior art.

It is a particular advantage of the present invention that the compositions may be obtained in forms capable of being handled conveniently in commerce. Most previously known urethane impregnating and bonding compositions have been of the two-component type and have not been adaptable to continuous production operations because of their short pot lives, continuously changing viscosity and working characteristics, and equipment clean-up problems. On the other hand, previously known urethane compositions of the one-component type have not been characterized by the high heat resistance and other desirable properties yielded by the products of the present invention. The compositions of the present invention may be formulated as stable, one-component systems possessing superior properties in the final polymerized form, and capable of being cured by short heating at 300°—500° F. under conditions permitting removal of solvent. Such formulations may be made by first reacting polymethylene polyphenylisocyanate with a phenolic blocking agent. The hydroxyl groups of the phenolic blocking agent react with the isocyanate groups of the polymethylene polyphenylisocyanate, and block the isocyanate groups from further chemical reaction at room temperature. When the blocked composition is heated, for example during the curing treatment, the phenolic blocking agent is driven off, and the isocyanate groups of the polymethylene polyphenylisocyanate are freed. The isocyanate groups then react with the hydroxyl groups of the polyester.

The mixture of blocked polymethylene polyphenylisocyanate and polyester in an inert organic solvent represents a particularly useful embodiment of the present invention, as it is a stable, one-component system which is conveniently handled in commerce.

Polymethylene polyphenylisocyanate is available commercially under the trademark PAPI. Its preparation is described in U.S. Pat. No. 2,683,730. Polymethylene polyphenylisocyanate is a mixture of polyisocyanates obtained by phosgenation of the materials formed by treating with acid the acid promoted condensation products of aniline and formaldehyde. Use of polymethylene polyphenylisocyanate is an essential feature of the present invention. Diisocyanates as a class do not yield products with the same desirable properties. Products from compositions based on diisocyanates tend in general to be soft, weak, and affected by heat unless short-chain, cross-linking agents such as water, glycols, diamines or amino alcohols are incorporated or unless branched rather than linear polyesters are utilized. In such cases there is a sacrifice in flexibility, ability to withstand cold bend tests and other valuable characteristics exhibited by the compositions of the present invention.

When previously known triisocyanates are utilized the compositions are inferior in heat resistance and lacking in toughness and flexibility.

The linear, long chain, hydroxyl-terminated polyesters used in the present invention are formed from adipic acid with ethylene glycol and propylene glycol. These polyesters are preferred because in the practice of the present invention they yield products which are superior in toughness, strength, and heat resistance to those derived from other linear or essentially linear polyesters, for example, those linear produced from adipic acid and diethylene glycol or diethylene glycol with a minor proportion of glycerol, trimethylolethane or other triol. For the purposes of the present invention, the polyesters have an equivalent weight of approximately 750. When the polyester has an equivalent weight of below 300, the resulting impregnating and bonding resin is too hard and brittle. On the other hand, when the polyester has an equivalent weight of above about 1200, the resulting resins are cheeselike, and too soft to be useful.

Although the proportion of ethylene glycol to propylene glycol in the polyester is not rigidly limited, it is preferred that the glycol component of the polyester be from about 50 to 90 percent by moles ethylene glycol with propylene glycol constituting the remaining 10—50 percent. Ethylene glycol appears to impart good mechanical properties while propylene glycol improves low temperature flexibility and freedom from hardening on aging. Particularly desirable results are obtained with polyesters wherein ethylene glycol constitutes 70—80 percent of the glycol component, with propylene glycol making up the balance. Such a polyester is typified by Morester 939. Morester 939 has a hydroxyl number of 56.6 and an acid number of 0.9. Another suitable polyester is "Multron" R–14 having hydroxyl number 55—60 and acid number of 1.5 or less.

In a valuable variation of the present invention, the resins are modified to make them self-extinguishing. This is accomplished by substituting halogenated bisphenolic glycols for approximately one-third to one-half of the equivalents of the polyester. Thus, from about one-third to one-half of the polyester may be replaced with 2,2-bis-(3,5-dibromo-4-(2-hydroxyethoxy)-phenyl)-propane. The latter compound is prepared by reacting 2,2-bis-(3,5-dibromo-4-hydroxy-phenyl)-propane in a Williamson synthesis with ethylene chlorohydrin and sodium hydroxide. Other halogenated bisphenolic glycols may also be used to impart self-extinguishing characteristics. Among the halogenated bisphenolic glycols suitable for this purpose are:

2,2 bis(3,5 dichloro-4(2-hydroxyethoxy)phenyl)-propane
2,2 bis(3,5 dibromo-4(2-hydroxypropoxy)phenyl-propane
2,2 bis(3,5 dichloro-4(2-hydroxypropoxy)phenyl)-propane.

Suitable compounds are those having the structural formula

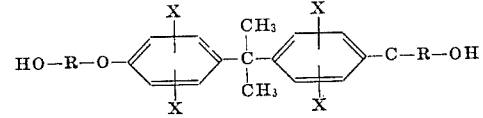

wherein X is selected from the class consisting of Cl and Br, and R is selected from the class consisting of -CH$_2$-CH$_2$-and -CH$_2$-CH-CH$_3$.

Although the brominated bisphenolic glycols are somewhat more effective in achieving self-extinguishing properties, the corresponding chlorinated derivatives are less expensive and thus may be preferred in some applications. The halogenated bisphenolic glycols of the type described above are particularly advantageous in the practice of the present invention because they do not detract from the desirable flexibility and toughness properties of the unmodified products of the invention, because they do not impair the heat resistance properties, and because the self-extinguishing properties they confer are not reduced even by prolonged exposure at 400° F. or higher. Conventional flame retardant additives, for example, tris(chloroethyl) phosphate or tris(dibromopropyl) phosphate failed to meet one or more of the preceding requirements.

Cresylic acid is the preferred phenolic blocking agent, but similar materials are also suitable. Suitable phenolic blocking agents include phenol and alkylated phenols containing up to a total of nine carbon atoms.

In the following examples Cresylic Acid No. 9 has been employed. Cresylic Acid No. 9 has the following analysis:

| | |
|---|---|
| Phenol | 15—18 percent |
| o-Cresol | 18—23 percent |
| m-Cresol | 17—21 percent |
| p-Cresol | 7—9 percent |
| $C_8$-$C_9$ Phenol | 32—40 percent |

Other a cresylic acids of commerce covering a wide range of phenol, cresol and xylenol contents may also be used. Toluene, xylene, cyclohexanone, perchloroethylene, diacetone alcohol t-amyl alcohol butyl acetate, ethyl acetate, and other inert solvents may be used in conjunction with cresylic acid as described in the subsequent Examples. It will be understood that alcohols may be considered inert solvents, despite the presence of NCO-reactive alcohol groups, if the NCO groups of the polymethylene polyphenylisocyanate are blocked by cresylic acid prior to introduction of the alcohol solvent, and if the alcohol is sufficiently volatile to escape during the heat cure cycle prior to unblocking of the polymethylene polyphenylisocyanate. The total proportion of solvents is preferably within the range 40—70 percent for most applications, but the proportion is not critical and may be as high as 90 percent or more, or as low as 10 percent or less.

In preparing compositions of the invention, the polymethylene polyphenylisocyanate may first be blocked by reaction with cresylic acid, then the blocked polymethylene polyphenylisocyanate solution mixed with a solution of the polyester. If a high viscosity is wanted, the polymethylene polyphenylisocyanate and polyester may be prereacted to any desired point, then the excess NCO groups blocked with cresylic acid to arrest the reaction and solubilize the resulting prepolymer. Alternatively, the polymethylene polyphenylisocyanate, polyester, and a portion of the cresylic acid are reacted simultaneously, with both prepolymerization and blocking taking place concurrently.

The blocking and other reactions are conveniently catalyzed by small amounts of tertiary amine catalysts, such as diethylethanolamine, ethyl diethanolamine, and the like. However, such catalysis is not essential, as the same results may be obtained by thermal means, although more slowly.

The ratio by equivalents between the polymethylene polyphenylisocyanate and the polyester and other reactive components can be varied from a low as 0.9:1 to as high as 1.35:1, but is preferably between 1.05:1 and 1.20:1, expressed as equivalents NCO per equivalent OH.

The following examples are given solely for purposes of illustration and are not to be considered as limiting the invention to these embodiments. Many modifications will be apparent to those skilled in the art without departing from the spirit or scope of the invention.

EXAMPLE 1

This example illustrates the use of the one-component coating composition of the present invention as a wire varnish for impregnating asbestos covered wire.

A solution of blocked polymethylene polyphenylisocyanate was prepared using 485 parts of polymethylene polyphenylisocyanate (isocyanate equivalent 133.6), 970 parts CresyliAcid No. 9 and 8.25 parts diethylethanolamine catalyst. This solution was thoroughly mixed with 6435 parts of a solution of 3217.5 parts of Morester 939 in 3217.5 parts of toluene. 18.5 parts of a spirit soluble black dye (Nubian Resin Black) in 185 parts of toluene and 166.5 parts of cresylic acid were dispersed in the final resin composition, which had a solids content of approximately 45 percent and a viscosity of about 55 cp.

This resin composition was applied in a commercial tower to an asbestos braid-covered, silicon rubber-jacketed, copper power cable wire. The cable construction was 7-strand American Wire Gauge No. 18 copper wire, and the silicone jacket measured 0.40 inch in thickness. The wire was passed five times through the resin bath to impregnate and saturate the absorbent asbestos braid-covering. The impregnated wire was then passed through a wiper to remove excess resin, and was consolidated and polished in a polishing dye before entering a curving oven. The oven was gas fired and approximately 20 feet in length. The temperature was maintained at 500° F. and the wire was passed through at a speed of 14 feet per minute The resin was found to penetrate asbestos covering uniformly, and to cure completely and satisfactorily during the cure cycle without bubbles or voids. It coated and cemented the asbestos fibers in place so that the finished cable was black, smooth, flexible and resistant to chemical attack. The cable had excellent heat resistance and electrical insulating characteristics.

EXAMPLE 2

The following example illustrates the formation of self-extinguishing wire varnish composition according to the present composition. A solution of blocked polymethylene polyphenylisocyanate was prepared by using 1470 parts polymethylene polyphenylisocyanate (isocyanate equivalent 133.6), 2490 parts Cresylic Acid 9, and 25 parts diethylethanolamine. This solution was thoroughly mixed with a solution of 4870 parts of Morester 939 and 1610 parts of 2,2-bis-(3,5-dibromo-4-(2-hydroxyethoxy)-phenyl)-propane in 4870 parts of toluene. The final resin composition, which contained approximately 50 percent solids, was used to saturate the asbestos braid-covered, silicone rubber-jacketed, power cable wire as described in the previous example. The physical and electrical properties which resulted in the finished cable was essentially the same as in the previous example, except that the material was self-extinguishing when tested in accordance with the method described in Underwriters' Laboratories' Flexible Cord and Fixture Wire Standard UL 62.

EXAMPLE 3

The following example illustrates the use of the composition of the present invention in the preparation of impregnated glass fabric to be used for electrical insulating purposes.

152 parts of polymethylene polyphenylisocyanate (isocyanate equivalent 138.5) was blocked with 304 parts Cresylic Acid No. 9, and 2.5 parts diethylethanolamine catalyst. The blocked polymethylene polyphenylisocyanate solution was mixed with a solution of 97.5 parts of Morester 939 in 292.5 parts of ethyl acetate. The resulting solution contained approximately 30 percent solids. Strips of 4 mil. ECC Fiberglas fabric were dipped into the solution, allowed to drain, and then cured at 400° F. for 10 minutes. Three coats were applied, with curing after each coat. The final product was tough, flexible and uniformly impregnated, and was useful as an electrical insulator because of its high dielectric strength.

EXAMPLE 4

The following example illustrates the preparation of a high viscosity impregnating composition suitable for use with woven glass sleeving. 1.688 parts by weight of polymethylene polyphenylisocyanate (isocyanate equivalent weight 135), 1.385 parts by weight Cresylic Acid No. 9, 10.5 parts by weight of "Morester" 939 and 0.093 parts by weight diethylethanolamine catalyst were mixed and heated at 100°–100° C. for 30 minutes. (A portion of the polymethylene polyphenylisocyanate first reacts partially with the polyester, and the remaining NCO groups are blocked by reaction with cresylic acid). 5.448 parts by weight cyclohexanone and 5.448 parts xylene were then added to yield product of 50 percent nonvolatiles and a viscosity of 370 cp. at 25° C. 0.105 parts of a 10 percent solution of "Bakelite AYAA" in cyclohexanone was then added as a flow control agent and the resulting solution used to impregnate lengths of No. 420 braided fiberglass sleeving by a simple dipping procedure. (Bakelite AYAA is a polyvinyl acetate). Diameter of the unimpregnated sleeving was approximately 0.1 inch, and thickness was 0.006—.007. The sleeving was dipped in the resin, excess resin was allowed to drain, then the sleeving section was cured in an oven for 15 minutes at 300° F. Three consecutive coats were applied by this method, which yielded a smooth flexible tube with excellent dielectric strength and heat resistance. Impregnation increased the thickness of the sleeving by 0.006—.007 inch.

EXAMPLE 5

The following example illustrates adaptability of the products of the present invention to storage-stable, heat-curable electrical insulating tapes.

15.3 parts by weight of polymethylene polyphenylisocyanate (equivalent weight 135) was blocked with Cresylic Acid No. 9 in the presence of a catalyst (using 30.6 Cresylic Acid No. 9 and 2.72 parts by weight diethylethanolamine). The blocked polymethylene polyphenylisocyanate solution was then mixed with 97.5 parts by weight "Morester" 939 and 24.4 parts toluene to yield a solution containing approximately 68 percent nonvolatiles.

A 10-inch by 14.5-inch section of glass cloth weighing 4.8 g. was saturated with a portion of the preceding resin composition, allowed to drain, then heated at 250° F. for 40 minutes, at 250°—300° F. for 5 minutes and at 300° F. for 5 minutes. The impregnated glass fabric weighed 9.8 g. corresponding to a binder content of 51 percent. The somewhat tacky impregnated glass cloth was cut into narrow strips and the strips wrapped in aluminum foil for storage-stability tests. When these strips were wrapped around a mandrel, they adhered to each other by simple contact pressure. These superimposed strips could be heat bonded to form a homogeneous, strong, flexible electrical insulation by subjecting the mandrel assembly to oven cure at 400° F. for 5 to 10 minutes.

This procedure was repeated after various storage periods, and it was found that curability remained unaffected even after storage of the strips for seven months under laboratory conditions.

Impregnated or coated glass fabric, nylon fabric or other base materials may be processed under time and temperature conditions adequate to remove solvents but not to unblock the polymethylene polyphenylisocyanate or cause premature reaction with the polyester. The resulting impregnated or coated fabrics may then be slit and wound into tapes which have great potential utility in the electrical industry.

The polymethylene polyphenylisocyanates used in the foregoing examples were prepared by the procedure set forth in Seeger et al. U.S. Pat. No. 2,683,730 by phosgenation of a polymethylene polyphenylamine mixture resulting from the reaction of 4 moles of aniline with 2.6 moles of formaldehyde in the presence of hydrochloric acid. The polymethylene polyphenyl amine mixtures thus prepared contain about 35 to 37 percent di(aminophenyl) methane and the balance higher molecular weight polyamines. On phosgenation the amine groups are converted to isocyanate groups.

By varying the ratio of aniline and formaldehyde other polymethylene polyphenylisocyanates containing from about 35 to about 60 percent of diisocyanate can be obtained. These, particularly those containing about 50 to 55 percent diisocyanate, can be used effectively to replace the polymethylene polyphenylisocyanates of the examples.

We claim:

1. An insulated wire conductor which comprises a wire conductor having an insulating fabric sheath thereon said sheath having been coated with a flexible polyurethane by a process which comprises the steps of:
   1. impregnating said fabric sheath with a mixture in an inert solvent of:
      a. the product obtained by reacting a polymethylene polyphenyl polyisocyanate mixture containing from about 35 to about 60 percent of methylenebis (phenylisocyanate) and a phenolic blocking agent selected from the group consisting of phenol and alkylated phenols having up to nine carbon atoms, said phenolic blocking agent being employed in an amount sufficient to block each free NCO group in said polyisocyanate; and
      b. a mixture of:
         i. from about one-half to about two-thirds by equivalents of a linear, long chain, hydroxyl-terminated polyester of adipic acid with ethylene glycol and propylene glycol, said polyester having an equivalent weight of from about 300 to about 1,200, an acid number of not more than 1.5; said ethylene glycol and propylene glycol being present in said polyester in the ratio of from 1 to 9 moles of ethylene glycol per mole of propylene glycol; and
         ii. from about one-half to about one-third by equivalents of a halogenated compound having the structure

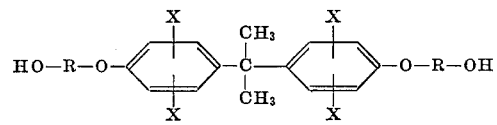

wherein X is selected from the class consisting of Cl and Br, and R is selected from the class consisting of -CH$_2$–CH$_2$- and -CH$_2$–CH-CH$_3$; and
   2. heating said impregnated sheath at a temperature of 300° to 500° F.

2. A storage stable electrical insulating fabric which is curable by heat at 300° to 500° F. to a flexible polyurethane coated fabric and which has been prepared by impregnating an electrical insulating fabric with a mixture in an inert solvent of:
   a. the product obtained by reacting a polymethylene polyphenyl polyisocyanate mixture containing from about 35 to about 60 percent of methylenebis(phenylisocyanate) and a phenolic blocking agent selected from the group consisting of phenol and alkylated phenols having up to nine carbon atoms, said phenolic blocking agent being employed in an amount sufficient to block each free NCO group in said polyisocyanate; and
   b. a mixture of:
      i. from about one-half to about two-thirds by equivalents of a linear, long chain, hydroxyl-terminated polyester of adipic acid with ethylene glycol and propylene glycol, said polyester having an equivalent weight of from about 300 to about 1,200, an acid number of not more than 1.5; said ethylene glycol and propylene glycol being present in said polyester in the ratio of from 1 to 9 moles of ethylene glycol per mole of propylene glycol; and
      ii. from about one-half to about one-third by equivalents of a halogenated compound having the structure

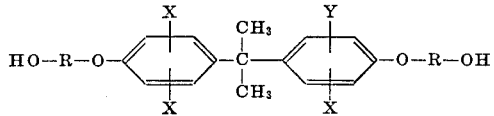

wherein X is selected from the class consisting of Cl and Br, and R is selected from the class consisting of -CH$_2$-CH$_2$-and -CH$_2$-CH-CH$_3$.